(12) United States Patent
Zhang et al.

(10) Patent No.: US 11,861,963 B2
(45) Date of Patent: Jan. 2, 2024

(54) SMART LOCK, SMART MONITORING SYSTEM AND SMART MONITORING METHOD

(71) Applicants: NUCTECH COMPANY LIMITED, Beijing (CN); Tsinghua University, Beijing (CN)

(72) Inventors: Li Zhang, Beijing (CN); Gang Peng, Beijing (CN); Qingping Huang, Beijing (CN); Liang Li, Beijing (CN); Fan Yang, Beijing (CN); Jiabao Chen, Beijing (CN); Kun Cheng, Beijing (CN); Zhifeng He, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 440 days.

(21) Appl. No.: 17/017,967

(22) Filed: Sep. 11, 2020

(65) Prior Publication Data

US 2021/0082221 A1    Mar. 18, 2021

(30) Foreign Application Priority Data

Sep. 12, 2019   (CN) .......................... 201910865256.1

(51) Int. Cl.
*G07C 9/29* (2020.01)
*G07C 9/20* (2020.01)
*G07C 9/00* (2020.01)

(52) U.S. Cl.
CPC ........... *G07C 9/29* (2020.01); *G07C 9/00182* (2013.01); *G07C 9/20* (2020.01); *G07C 2009/0019* (2013.01)

(58) Field of Classification Search
CPC ........ G07C 9/29; G07C 9/20; G07C 9/00182; G07C 2009/0019; G07C 9/00174; G07C 9/00309; G07C 9/00
See application file for complete search history.

(56) References Cited

U.S. PATENT DOCUMENTS 8,106,752 B2 *   1/2012   Golden .............. G08B 13/2491
                                                340/539.11
9,703,295 B1 *   7/2017   Neal, III ................. B64C 31/02
                          (Continued)

FOREIGN PATENT DOCUMENTS

CN      106340087 A      1/2017
CN      107256600 A     10/2017
(Continued)

OTHER PUBLICATIONS

Chinese Office Action for CN Application No. 201910865256.1 dated Jul. 16, 2021 (12 pages).
(Continued)

*Primary Examiner* — Daniel I Walsh
(74) *Attorney, Agent, or Firm* — Merchant & Gould P.C.

(57) ABSTRACT

The present disclosure provides a smart lock, including: a lock body and an unlocking structure; a Bluetooth communication module configured to receive a lock instruction or an unlock instruction based on Bluetooth communication; and one or more binding tags, each binding tag being associated with a Bluetooth address of the smart lock, wherein the unlocking structure is configured to lock or unlock the smart lock based on the lock instruction or the unlock instruction, or lock or unlock the smart lock based on an operation performed for the one or more binding tags. The present disclosure further provides a system and method for monitoring an object equipped with the smart lock.

16 Claims, 4 Drawing Sheets

(56) References Cited

U.S. PATENT DOCUMENTS

| | | | | |
|---|---|---|---|---|
| 10,437,978 | B2* | 10/2019 | Barsness | G06F 21/35 |
| 10,760,332 | B2* | 9/2020 | Kincaid | G08B 13/08 |
| 11,430,274 | B1* | 8/2022 | Jakes | G07C 9/28 |
| 11,663,864 | B2* | 5/2023 | Kincaid | H04W 4/021 |
| | | | | 340/5.31 |
| 2002/0032039 | A1* | 3/2002 | Kimata | G01S 19/35 |
| | | | | 455/556.1 |
| 2006/0072755 | A1* | 4/2006 | Oskari | G07C 9/00309 |
| | | | | 380/270 |
| 2009/0136035 | A1* | 5/2009 | Lee | G07C 9/00309 |
| | | | | 380/270 |
| 2010/0201482 | A1* | 8/2010 | Robertson | G07C 9/00904 |
| | | | | 340/5.61 |
| 2012/0003932 | A1* | 1/2012 | Zhodzishsky | H04W 52/0229 |
| | | | | 455/41.2 |
| 2013/0125231 | A1* | 5/2013 | Kuenzi | H04W 12/04 |
| | | | | 726/16 |
| 2014/0002239 | A1 | 1/2014 | Rayner | |
| 2014/0188638 | A1* | 7/2014 | Jones | G06Q 20/206 |
| | | | | 705/16 |
| 2014/0373117 | A1* | 12/2014 | Le Saint | G06F 21/34 |
| | | | | 726/6 |
| 2015/0121465 | A1* | 4/2015 | Berns | G07C 9/00174 |
| | | | | 726/4 |
| 2015/0221152 | A1* | 8/2015 | Andersen | G07C 9/27 |
| | | | | 340/5.22 |
| 2015/0256996 | A1* | 9/2015 | Allen | H04M 1/72463 |
| | | | | 455/418 |
| 2015/0322693 | A1* | 11/2015 | Levine | E05B 39/005 |
| | | | | 70/51 |
| 2016/0042582 | A1* | 2/2016 | Hyde | E05B 47/00 |
| | | | | 70/53 |
| 2016/0050642 | A1* | 2/2016 | Brown | H04W 8/22 |
| | | | | 455/418 |
| 2016/0142877 | A1* | 5/2016 | Gujral | E05F 15/77 |
| | | | | 455/456.1 |
| 2016/0180620 | A1* | 6/2016 | Eyring | G07C 9/22 |
| | | | | 235/382 |
| 2016/0217638 | A1* | 7/2016 | Child | H04L 12/2827 |
| 2016/0285717 | A1* | 9/2016 | Kim | H04L 41/0631 |
| 2016/0350990 | A1 | 12/2016 | Lin | E05B 67/24 |
| 2016/0350992 | A1 | 12/2016 | Telljohann | G07C 9/28 |
| 2017/0046893 | A1* | 2/2017 | Tseng | G07C 9/28 |
| 2017/0074002 | A1* | 3/2017 | Cooper | E05B 65/523 |
| 2017/0236345 | A1* | 8/2017 | Watters | G07C 9/00309 |
| | | | | 340/5.61 |
| 2017/0236351 | A1* | 8/2017 | Menard | H04W 4/80 |
| | | | | 340/5.61 |
| 2018/0162321 | A1* | 6/2018 | Spiess | G07C 9/00309 |
| 2018/0165633 | A1* | 6/2018 | Chen | G06Q 10/0833 |
| 2018/0171665 | A1* | 6/2018 | Anderson | E05B 39/005 |
| 2018/0190056 | A1* | 7/2018 | Desinor, Jr. | G07C 9/00309 |
| 2018/0230713 | A1 | 8/2018 | Sidhu et al. | |
| 2018/0265040 | A1* | 9/2018 | Nowottnick | B60R 25/24 |
| 2019/0017294 | A1* | 1/2019 | Sternlight | E05B 35/105 |
| 2019/0172285 | A1* | 6/2019 | Jin | H04W 4/33 |
| 2019/0194978 | A1* | 6/2019 | Cooper | E05B 65/5246 |
| 2019/0325717 | A1* | 10/2019 | Anderson | G08B 13/19613 |
| 2020/0168017 | A1* | 5/2020 | Prostko | G07C 9/00896 |
| 2020/0193785 | A1* | 6/2020 | Berglund | G08B 13/2485 |
| 2020/0198576 | A1* | 6/2020 | Schwegler | B60R 25/403 |
| 2020/0202652 | A1* | 6/2020 | Kuenzi | G07C 9/27 |
| 2020/0327758 | A1* | 10/2020 | Ma | H04M 1/72409 |
| 2021/0054653 | A1* | 2/2021 | Bloom | E05B 17/0087 |
| 2021/0082064 | A1* | 3/2021 | Briffa | G06Q 10/02 |
| 2021/0082221 | A1* | 3/2021 | Zhang | A45C 13/18 |
| 2021/0181356 | A1* | 6/2021 | Hasegawa | H04L 67/12 |
| 2021/0189770 | A1* | 6/2021 | Evarts | G07C 9/00174 |

FOREIGN PATENT DOCUMENTS

| | | |
|---|---|---|
| CN | 107264313 A | 10/2017 |
| CN | 107481356 A | 12/2017 |
| CN | 107749097 A | 3/2018 |
| CN | 108234625 A | 6/2018 |
| CN | 108389285 A | 8/2018 |
| CN | 108898709 A | 11/2018 |
| CN | 208129676 U | 11/2018 |
| CN | 208207951 U | 12/2018 |
| CN | 109191638 A | 1/2019 |
| CN | 109727356 A | 5/2019 |
| CN | 109727357 A | 5/2019 |
| CN | 109767521 A | 5/2019 |
| CN | 110200603 A | 9/2019 |
| JP | 2017-517318 A | 6/2017 |

OTHER PUBLICATIONS

Extended European Search Report for European Patent Application No. 20195460.9 dated May 17, 2021, 13 pages.

International Search Report and Written Opinion of the International Searching Authority for International Patent Application No. PCT/CN2020/091572 dated Aug. 25, 2020, 11 pages.

Japanese Office Action for Japanese Patent Application No. 2020-150667 dated Jun. 29, 2021, 3 pages.

* cited by examiner

SMART LOCK, SMART MONITORING SYSTEM AND SMART MONITORING METHOD

CROSS-REFERENCE TO RELATED APPLICATION

This application claims a priority to Chinese Application No. 201910865256.1 filed on Sep. 12, 2019, the contents of which are incorporated herein by reference in their entirety.

TECHNICAL FIELD

The present disclosure generally relates to the field of smart monitoring, and more specifically, to a smart lock, a smart monitoring system and a smart monitoring method for monitoring an object equipped with the smart lock.

BACKGROUND

Customs supervision of luggage requires positioning and tracking of luggage in the indoor environment, specifying the area where the luggage cannot enter, and giving early warning or alarm when the luggage enters the area. At the same time, the luggage may be unlocked according to the set authority, and the unlocking does not rely on the physical key.

At present, the positioning of smart locks on the market is basically performed with GPS. On the one hand, GPS signals are easily affected by buildings, leading to the positioning unavailable. On the other hand, GPS cannot provide sufficient positioning accuracy. Standard Positioning Service (SPS) has an accuracy of 100 m, and GPS Precision Positioning Service (PPS) has an accuracy of 10 m. Obviously, the positioning accuracy of 10 m to 100 m cannot meet the requirements of indoor positioning.

In addition, the current smart locks on the market all use Bluetooth technology to unlock, mainly by selecting the target lock to be operated. All smart locks using Bluetooth technology on the market need to turn on and activate Bluetooth first. The problem with the above products is that Bluetooth must be activated first and then connected to unlock, and the operation is relatively cumbersome. If it is required to simultaneously operate a plurality of smart locks, the target locks to be operated need to be selected one by one, and the use is inconvenient.

SUMMARY

In order to solve at least some of the above problems, according to a first aspect of the present disclosure, there is provided a smart lock, comprising: a lock body and an unlocking structure; a Bluetooth communication module configured to receive a lock instruction or an unlock instruction based on Bluetooth communication; and one or more binding tags, each binding tag being associated with a Bluetooth address of the smart lock, wherein the unlocking structure is configured to lock or unlock the smart lock based on the lock instruction or the unlock instruction, or lock or unlock the smart lock based on an operation performed on the one or more binding tags.

In some embodiments, the one or more binding tags comprise at least one of: an identification code, which is a barcode or a two-dimensional code; and a RFID tag.

In some embodiments, locking or unlocking the smart lock based on an operation performed on the one or more binding tags comprises at least one of: locking or unlocking the smart lock based on an operation of scanning the barcode or two-dimensional code; and locking or unlocking the smart lock based on an operation of reading the RFID tag.

In some embodiments, the smart lock further comprises a UWB positioning module configured to determine a position of the smart lock based on a UWB positioning method.

According to a second aspect of the present disclosure, there is provided a smart monitoring system for monitoring an object equipped with the above-mentioned smart lock, the system comprising: a positioning subsystem configured to determine, based on the UWB positioning module of the smart lock, an area where the smart lock is located; an adjustment subsystem configured to adjust a sampling mode of the positioning subsystem based on properties of the area where the smart lock is located; an alarm subsystem configured to turn on or turn off the Bluetooth communication module of the smart lock based on the area where the smart lock is located, and generate alarm information when it is determined that the smart lock enters a set area.

In some embodiments, the positioning subsystem comprises: a plurality of UWB base stations arranged in a gate channel for the object equipped with the smart lock to pass through, each of the plurality of UWB base stations communicating with the UWB positioning module; a processing module configured to obtain distance data based on a distance measurement between the plurality of UWB base stations and the UWB positioning module, and calculate, based on the distance data, the area where the smart lock is located.

In some embodiments, the positioning subsystem comprises two UWB base stations. The processing module is configured to obtain first distance data and second distance data based on the distance measurement between each of the two UWB base stations and the UWB positioning module, calculate a first distance condition parameter and a second distance condition parameter based on the first distance data and the second distance data and a length and inner diameter of the gate channel, and determine, based on the first distance condition parameter and the second distance condition parameter, the area where the smart lock is located.

In some embodiments, the adjustment subsystem being configured to adjust a sampling mode of the positioning subsystem based on properties of the area where the smart lock is located comprises: reducing a sampling frequency of the positioning subsystem when it is determined that the object equipped with the smart lock passes through a first type of area; and increasing a sampling frequency of the positioning subsystem when it is determined that the object equipped with the smart lock passes through a second type of area.

According to a third aspect of the present disclosure, there is provided a smart monitoring method for monitoring an object equipped with the above-mentioned smart lock, the method comprising: calculating an area where the smart lock passing through the positioning subsystem is located; adjusting a sampling mode of the positioning subsystem based on properties of the area where the smart lock is located; turning on or turning off the Bluetooth communication module of the smart lock based on the area where the smart lock is located; and generating alarm information when it is determined that the smart lock enters a set area.

In some embodiments, the positioning subsystem comprises a plurality of UWB base stations. Calculating the area where the smart lock passing through the positioning subsystem is located comprises: obtaining distance data based on a distance measurement between the plurality of UWB base stations and the UWB positioning module of the smart lock; and calculating, based on the distance data, the area where the smart lock is located.

In some embodiments, the positioning subsystem comprises two UWB base stations. Calculating the area where the smart lock passing through the positioning subsystem is located comprises: obtaining first distance data and second distance data based on the distance measurement between each of the two UWB base stations and the UWB positioning module; calculating a first distance condition parameter and a second distance condition parameter based on the first distance data and the second distance data and a length and inner diameter of the gate channel for the object equipped with the smart lock to pass through; determining, based on the first distance condition parameter and the second distance condition parameter, the area where the smart lock is located.

In some embodiments, the adjustment subsystem being configured to adjust a sampling mode of the positioning subsystem based on properties of the area where the smart lock is located comprises: reducing a sampling frequency of the positioning subsystem when it is determined that the object equipped with the smart lock passes through a first type of area; and increasing a sampling frequency of the positioning subsystem when it is determined that the object equipped with the smart lock passes through a second type of area.

According to another aspect of the present disclosure, there is provided an electronic device, comprising: a memory for storing instructions; and at least one processor, wherein the at least one processor executes the instructions stored in the memory, so as to perform the above-mentioned method.

According to yet another aspect of the present disclosure, there is provided a non-transitory computer-readable storage medium having computer instructions stored thereon, the computer instructions performing the above-mentioned method when executed by the processor.

According to the embodiments of the present disclosure, it is possible to realize the unlocking operation of the smart lock without frequently operating the Bluetooth communication module, thereby simplifying the use of the smart lock. The system for monitoring the object equipped with the smart lock may determine, based on UWB ranging technology, different areas where the smart lock is located, and adjust the sampling frequency of the positioning and ranging operation based on the different areas, which effectively reduces the cost and power consumption of the system.

BRIEF DESCRIPTION OF THE ACCOMPANYING DRAWINGS

The above and other features of the present disclosure will become more apparent through the following detailed description in conjunction with the accompanying drawings, in which.

In the accompanying drawings, the same or similar structures are denoted by the same or similar reference signs.

DETAILED DESCRIPTION

In order to make the purpose, technical scheme and advantages of the present disclosure clearer, the present disclosure will be further described in detail below in conjunction with the accompanying drawings. It should be noted that the following description is for illustration only and not intended to limit the present disclosure. In the following description, a number of specific details are set forth in order to provide a thorough understanding of the present disclosure. However, it will be apparent to those ordinary skilled in the art that these specific details are not necessary to implement the present disclosure. In other examples, in order to avoid confusion with the present disclosure, well-known circuits, materials or methods are not specifically described.

Throughout the specification, references to "one embodiment," "an embodiment," "one example" or "an example" mean that a specific feature, structure or characteristic described in conjunction with the embodiment or example is included in at least one embodiment of the present disclosure. Therefore, the phrases "in one embodiment", "in an embodiment", "one example" or "an example" appearing in various portions throughout the specification do not necessarily refer to the same embodiment or example. Further, specific features, structures or characteristics may be combined in one or more embodiments or examples in any suitable combination and/or sub-combination. In addition, those ordinary skilled in the art should understand that the accompanying drawings provided herein are for the illustrative purpose, and the accompanying drawings are not necessarily drawn to scale. The term "and/or" as used here includes any and all combinations of one or more related listed items.

Figure 1:
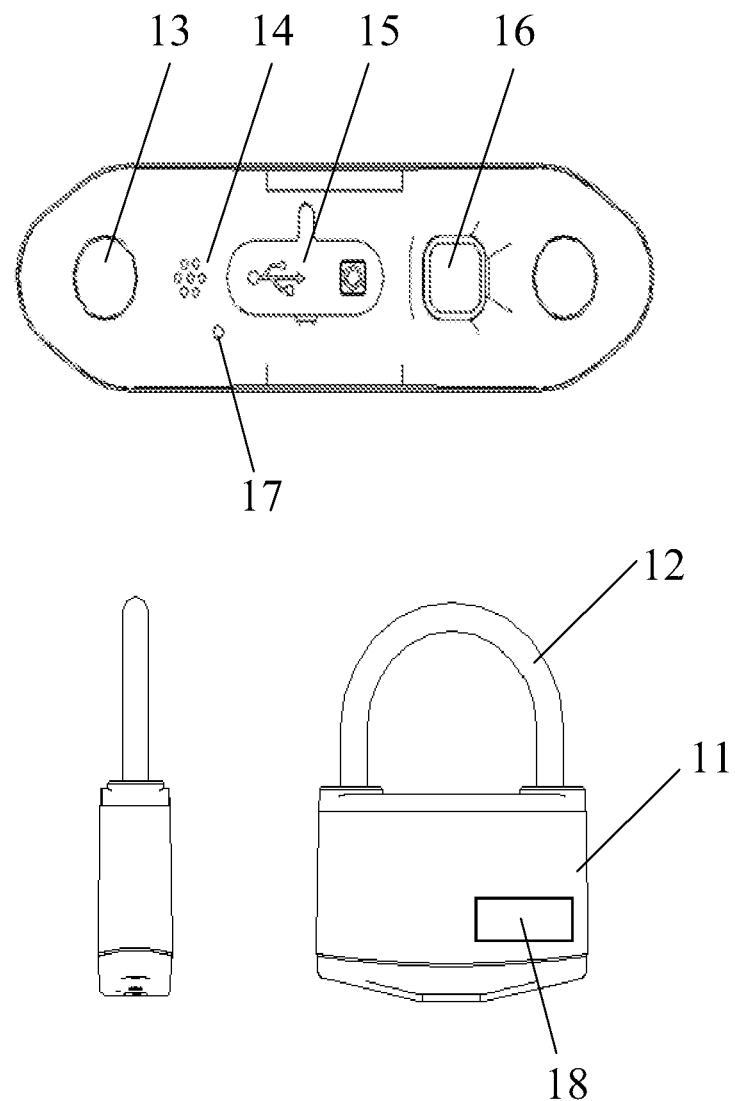
FIG. 1 shows a schematic structural diagram of a smart lock according to an embodiment of the present disclosure.

FIG. 1 shows a schematic structural diagram of a smart lock according to an embodiment of the present disclosure. As shown in FIG. 1, an upper part of FIG. 1 shows a bottom view of the smart lock, a lower left part of FIG. 1 shows a side view of a lock body of the smart lock, and a lower right part of FIG. 1 shows a front view of the lock body.

The smart lock according to the embodiment of the present disclosure is mainly composed of a lock body and an unlocking structure. It mainly includes a lock body 11, a replaceable shackle 12, a lock hole 13, a buzzer 14, a charger and keyhole 15, a fingerprint module 16 and an LED indicator 17. A number of control and communication modules are integrated inside the lock body 11, including an unlocking structure, an electronic control module, a Bluetooth communication module, a UWB positioning module, and a power management module.

Further, the smart lock according to the embodiment of the present disclosure further includes one or more binding tags 18, preferably arranged at any suitable position on the lock body, as shown in the front view in the lower part of FIG. 1. Each of the binding tags may be associated with the Bluetooth address of the smart lock. Specifically, each of the binding tags is bound to the smart lock and the Bluetooth address of the smart lock in a one-to-one manner.

Any existing Internet of Things technology can be used to implement the one or more binding tags. In some embodiments, the one or more binding tags may be barcodes or two-dimensional codes, or may be RFID tags. The barcode or two-dimensional code or RFID tag is bound to the Bluetooth address of the smart lock in a one-to-one manner.

In some embodiments, the smart lock may be locked or unlocked based on an operation performed on the one or more binding tags, specifically by scanning the barcode or two-dimensional code, or reading the RFID tag. Because the barcode or two-dimensional code or RFID tag is correspondingly bound to the smart lock, the corresponding smart lock may be uniquely selected by the operation performed on the barcode or two-dimensional code or RFID tag, so as to realize the unlocking by scanning the code or reading the RFID tag.

In many cases, the operator is not sensitive to which smart lock to use, but deeply remembers the locked items. Therefore, it is not in line with the operators inertial thinking to search for the smart lock to perform the unlocking. In the embodiment of the present disclosure, the unlocking is performed by using a binding tag (such as a barcode or a two-dimensional code or a RFID tag) provided on the smart lock. It is possible to unlock the smart lock without frequently operating the Bluetooth communication module, thereby simplifying the use of the smart lock.

According to the embodiment of the present application, the Bluetooth communication module of the smart lock may be configured to receive a lock instruction or an unlock instruction based on Bluetooth communication. Therefore, in some embodiments, Bluetooth activation may also be performed by turning on the Bluetooth communication module of the smart lock, then the lock or unlock instruction is received based on the Bluetooth communication technology, and the smart lock is locked or unlocked according to the received lock or unlock instruction.

According to the embodiment of the present disclosure, the UWB positioning module of the smart lock is configured to determine a position of the smart lock based on a UWB positioning method.

UWB (Ultra Wideband) is a wireless carrier communication technology. It does not use sinusoidal carrier wave, but uses nanosecond-level non-sinusoidal narrow pulses to transmit data, so it occupies a wide frequency spectral range. UWB technology has the advantages of low system-complexity, low power spectral density of transmitted signals, insensitive to channel fading, low interception capability, and high positioning accuracy.

When using UWB positioning, the UWB positioning module of the moving object (in this embodiment, the smart lock equipped with the UWB positioning module) may communicate with each of the UWB base stations through the coordinate system formed by the UWB positioning module and the UWB base stations, and the location information of the moving object may be obtained by distance measurement between the UWB positioning module and the UWB base stations. The principle of UWB positioning will be described in detail below in conjunction with the embodiment of the smart monitoring system and smart monitoring method for monitoring an object equipped with the smart lock.

The smart lock according to the embodiment of the present disclosure is powered by a lithium battery, which supplies power to the electronic control module, the Bluetooth communication module and the UWB positioning module through the power management module. The electronic control module is configured to control the operation of the motor to drive the unlocking structure to unlock.

In some embodiments, the Bluetooth address corresponding to the smart lock may be set by a background system, and the one or more binding tags may be bound to the Bluetooth address of the smart lock by a binding workstation. The binding between the smart lock and the locked object may be realized by taking pictures of the appearance of the object, so that the smart lock can be unlocked according to the locked object, thereby simplifying the unlocking process. The binding workstation may be a personal computer PC or a mobile terminal, which is not limited in the embodiments of the present disclosure.

Figure 2:
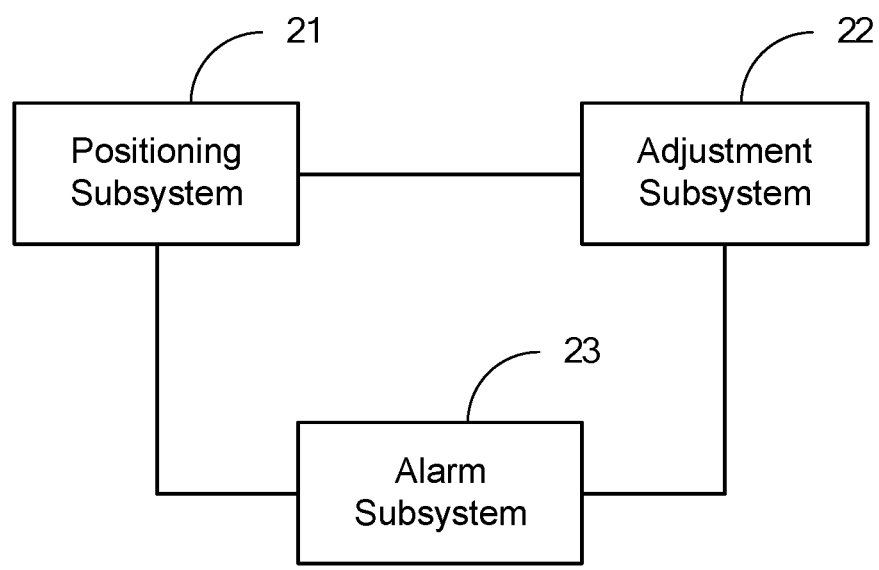
FIG. 2 shows a block diagram of a smart monitoring system according to an embodiment of the present disclosure.

FIG. 2 shows a block diagram of a smart monitoring system according to an embodiment of the present disclosure. The smart monitoring system is mainly used to monitor an object equipped with the smart lock. As shown, the smart monitoring system includes a positioning subsystem 21, an adjustment subsystem 22 and an alarm subsystem 23, which are connected to one another.

In some embodiments, the positioning subsystem 21 is configured to determine, based on the UWB positioning module of the smart lock, an area where the smart lock is located. The adjustment subsystem 22 is configured to adjust a sampling mode of the positioning subsystem 21 based on properties of the area where the smart lock is located. The alarm subsystem 23 is configured to turn on or turn off the Bluetooth communication module of the smart lock based on the area where the smart lock is located.

In some embodiments, the positioning subsystem 21 comprises a plurality of UWB base stations and a processing module. The plurality of UWB base stations are arranged in a gate channel for the object equipped with the smart lock to pass through. Each of the plurality of UWB base stations may communicate with the UWB positioning module.

The UWB positioning module may be a UWB tag. The UWB base stations may position UWB tag. The plurality of UWB base stations form a coordinate system within the distance measurement range. When the object equipped with the smart lock enters the detection range of the plurality of UWB base stations, the UWB positioning module of the smart lock enters the above-mentioned coordinate system.

Since the UWB positioning module is in communication with each of the UWB base stations, the processing module may obtain distance data based on the distance measurement between the plurality of UWB base stations and the UWB positioning module, and determine coordinates of the smart lock in the above-mentioned coordinate system based on the distance data.

For example, when two UWB base stations are installed in the gate channel, a symmetrical layout or other layouts may be selected according to actual needs. When the UWB tag of the smart lock moves in the gate channel, distance values A and B between the UWB tag and the UWB base stations on both sides of the gate channel are obtained by the process of distance measurement. Background service calculates distance condition parameters a and b in real time according to the distance values A and B and parameters such as a length and inner diameter of the gate channel. When the distance condition parameters a and b meet preset conditions, it is considered that the UWB tag is moving in the gate channel, otherwise, it is not in the gate channel. Then corresponding alarm information may be generated according to the system settings.

In some embodiments, the maximum value among the lengths from the UWB base stations on both sides of the gate channel to the entrances on the opposite side of the gate channel may be taken as the maximum value, and the vertical distance between the smart lock in the gate channel and the UWB base stations may be taken as the minimum value. For example, the minimum value may be set to 0 m. The base stations on both sides form two overlapping fan-shaped coverage areas, which are positioning and alarm-identifying areas.

In some embodiments, the monitoring space through which the object equipped with the smart lock passes may be divided. The division of areas may be performed according to different standards. In some embodiments, the division may be performed based on importance of areas. For example, compared with the duration of the UWB positioning module in the entire area, the duration of the UWB positioning module in the area where the gate channel is located is relatively short. Therefore, the area where the gate channel is located is set as a high-importance area, and the area before entering the gate channel or after leaving the gate channel may be set as a low-importance area. After the monitoring space is divided into a plurality of areas, the processing module may further follow up the calculated position of the smart lock to determine the area where the smart lock is located.

For example, when the object equipped with the smart lock passes through a first type of area with low importance, the sampling frequency of the positioning subsystem is reduced, and when the object equipped with the smart lock passes through a second type of area with high importance, the sampling frequency of the positioning subsystem is increased.

Specifically, the settings of the method for dividing the areas and the sampling frequency for different area may be divided into multiple levels, and the sampling frequency is related to the importance of the area. When the UWB positioning module enters the low-importance area, the reporting frequency (the sampling frequency) is reduced to reduce system power consumption. When the UWB positioning module enters a high-importance area, the reporting frequency is increased to reduce the response time interval. Since the duration of the UWB positioning module in the area where the gate channel is located is relatively short compared to that in the entire area, the reporting frequency in the area where the gate channel is located may be increased, so as to obtain more detection data, which helps to improve the monitoring accuracy. As for the area outside the gate channel, the reporting frequency therein may be reduced, so as to reduce the power consumption of the system while achieving appropriate monitoring accuracy.

Figure 3:
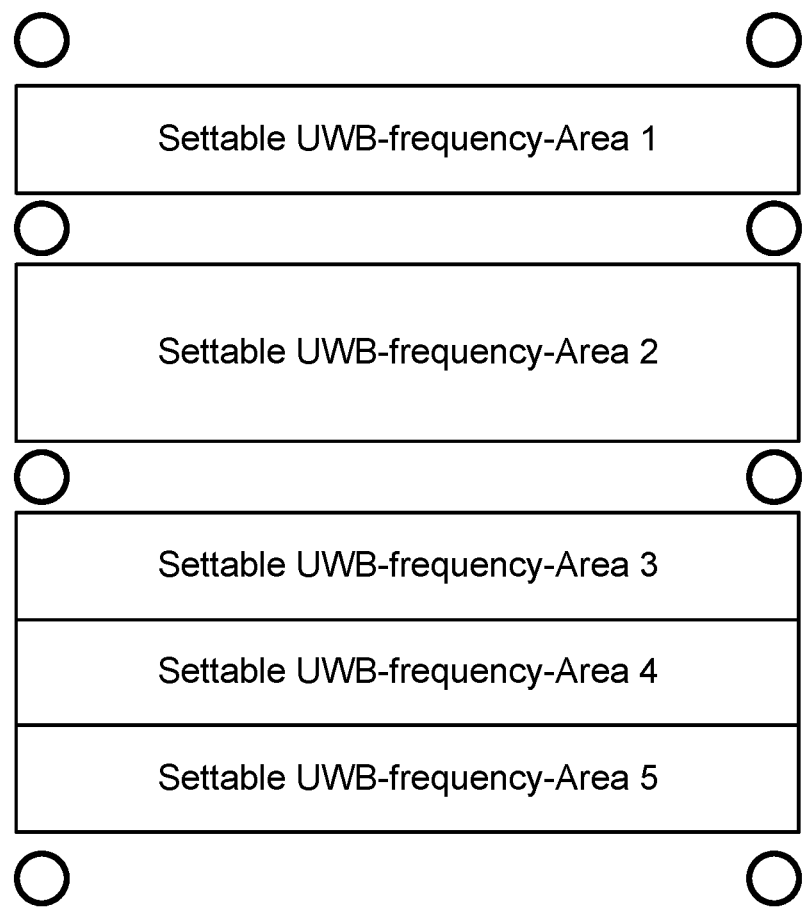
FIG. 3 shows an example of area division of a smart monitoring system and a smart monitoring method according to an embodiment of the present disclosure.

In some embodiments, the monitoring space through which the object equipped with the smart lock passes may be further divided into a plurality of areas, such as two or more areas as shown in FIG. 3.

The monitoring space at the front end of the gate channel, inside the gate channel, and at the exit of the gate channel is divided into 5 areas. The division may be performed according to the actual configuration and actual needs of each area, and the parameters of the smart lock are configured separately in different areas. The parameters to be configured include, but are not limited to, Bluetooth on or off, UWB reporting frequency, whether to allow unlocking, and the like. Generally, the unlocking is allowed only in the unlocking area.

For example, in the embodiment shown in FIG. 3, the following can be set according to the different areas where the smart lock is located.

When the smart lock enters settable UWB-frequency-area 1 (for example, 100 meters away from the gate channel), UWB reports every 10 seconds, and Bluetooth is turned off.

When the smart lock enters settable UWB-frequency-area 2 (for example, 50-100 meters away from the gate channel), UWB reports every 5 seconds, and Bluetooth is turned off.

When the smart lock enters settable UWB-frequency-area 3 (for example, 30-50 meters away from the gate channel), UWB reports every 3 seconds, and Bluetooth is turned off.

When the smart lock enters settable UWB-frequency-area 4 (for example, 10-30 meters away from the gate channel), UWB reports every 1 second, and Bluetooth is turned off.

When the smart lock enters settable UWB-frequency-area 5 (for example, 0-10 meters away from the gate channel), UWB reports three times every 1 second, and Bluetooth is turned off.

When the smart lock enters the unlocking area, Bluetooth is turned on.

In some embodiments, the adjustment subsystem 22 adjusts the sampling mode of the positioning subsystem 21 based on properties of the area where the smart lock is located. The properties of the area where the smart lock is located may be, for example, the importance of the above-mentioned areas. The sampling mode of the positioning subsystem 21 may be, for example, the reporting frequency of the detection data.

In addition, the alarm subsystem 23 may turn on or turn off the Bluetooth communication module of the smart lock based on the area where the smart lock is located. When the UWB positioning module enters the low-importance area, the Bluetooth communication module of the smart lock may be turned off, because the unlocking operation is generally not performed at this time. When the UWB positioning module enters the high-importance area, the Bluetooth communication module of the smart lock may be turned on, so that the unlock instruction can be transmitted via the Bluetooth communication module when the unlocking operation is required. By setting different states of the Bluetooth communication module, the power consumption of the system can be further reduced.

By switching the sampling frequency based on the different areas where the smart lock is located, the UWB reporting frequency can be matched with the specific scenario, so as to effectively control the power consumption, which improves energy efficiency and helps environmental protection.

In other embodiments, in addition to pre-setting the importance of the area, the unlocking area may also allowed to set the activation and deactivation of the Bluetooth communication module and the alarm device in the smart lock, such as whether the buzzer alarms or not. Those skilled in the art may easily conceive of the modifications of these embodiments, which will not be repeated here.

Figure 4:
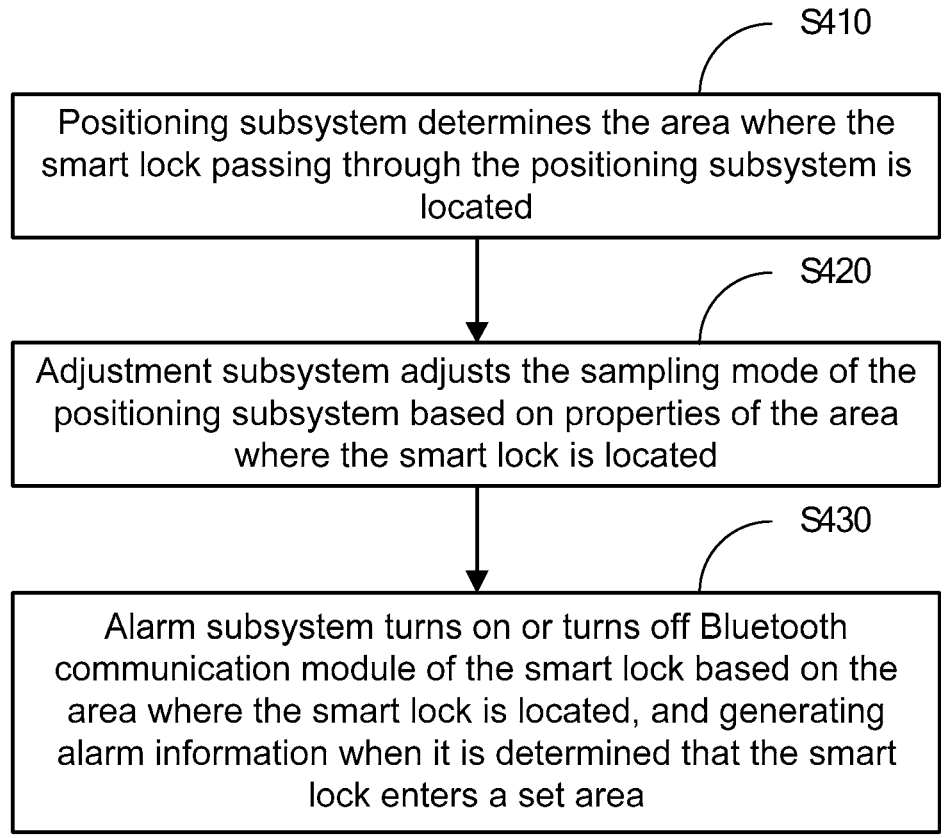
FIG. 4 shows a flowchart of a smart monitoring method according to an embodiment of the present disclosure.

FIG. 4 shows a flowchart of a smart monitoring method according to an embodiment of the present disclosure. The smart monitoring method is mainly used to monitor the object equipped with the smart lock. As shown, the method includes the following steps.

In S410, the positioning subsystem determines the area where the smart lock passing through the positioning subsystem is located.

In S420, the adjustment subsystem adjusts the sampling mode of the positioning subsystem based on properties of the area where the smart lock is located.

In S430, the alarm subsystem turns on or turns off the Bluetooth communication module of the smart lock based on the area where the smart lock is located, and generating alarm information when it is determined that the smart lock enters a set area.

Specifically, the step in which the positioning subsystem determines the area where the smart lock passing through the positioning subsystem is located comprises obtaining distance data based on the distance measurement between the plurality of UWB base stations and the UWB positioning module, and calculating, based on the distance data, the area where the smart lock is located.

When the object equipped with the smart lock passes through the first type of area, the sampling frequency of the positioning subsystem is reduced, and when the object equipped with the smart lock passes through the second type of area, the sampling frequency of the positioning subsystem is increased.

For more operation details, reference may be made to the above-mentioned embodiments, which will not be repeated here.

The smart lock, smart monitoring system and smart monitoring method according to the embodiments of the present disclosure can achieve 100% alarm rate and 100% alarm accuracy of the UWB positioning module in complex situations such as under high interference of metal channels, thereby realizing accurate alarms in the channel without false alarms in adjacent channels. That is to say, as long as the smart lock enters the set area, it will alarm without omission, and when there are a plurality of gate channels in the set area, only the corresponding channel which the smart lock enters will alarm, without false alarms in other channels. Furthermore, the alarm response time can be shortened to milliseconds.

The smart lock, smart monitoring system and smart monitoring method according to the embodiments of the present disclosure can effectively reduce cost of the system. The gate channel with UHF RFID readers costs about RMB 40,000, while the cost estimation of the gate channel with UWB base stations is only RMB 4,000, with a cost reduction of 90%.

In addition, the UWB tags used therein are recyclable and reusable tags, which are more environmentally friendly than disposable RFID adhesive tags and will not produce subsequent consumables costs. By switching the sampling frequency based on different areas, the power consumption may be effectively controlled to match the usage scenario, thereby effectively improving energy efficiency and helping environmental protection. The embodiments of the present disclosure can achieve both low power consumption and high performance, and have wide application prospects. Those skilled in the art shall understand that the method shown above is only illustrative. The method of the present disclosure is not limited to the steps and order shown above. Those skilled in the art may make many changes and modifications based on the teaching of the exemplary embodiments.

Figure 5:
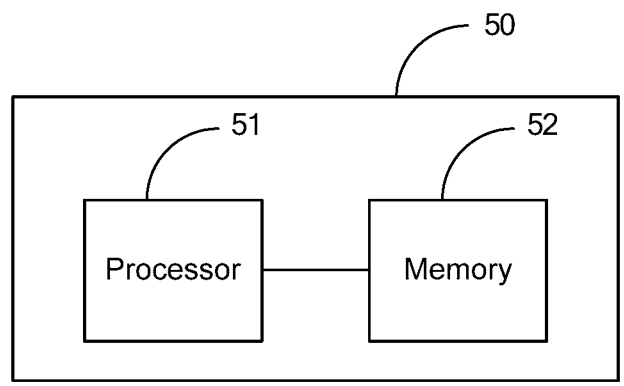
FIG. 5 shows a block diagram of an electronic device according to an embodiment of the present disclosure.

FIG. 5 shows a block diagram of an electronic device according to an embodiment of the present disclosure. As shown in FIG. 5, the electronic device 50 may include one or more processor 51 and a memory 52 for storing one or more program. The one or more program, when executed by the one or more processor 51, causes the one or more processor 51 to perform the smart monitoring method described in the foregoing embodiments.

Although the present disclosure has been described above in conjunction with preferred embodiments of the present disclosure, those skilled in the art shall understand that various modifications, substitutions and changes can be made to the present disclosure without departing from the spirit and scope of the present disclosure. Therefore, the present disclosure should not be limited by the above-mentioned embodiments, but should be defined by the appended claims and their equivalents.

The invention claimed is:

1. A smart monitoring system for monitoring an object equipped with a smart lock, the smart lock comprising: an Ultra Wide Band (UWB) positioning module configured to determine a position of the smart lock based on a UWB positioning method; and a Bluetooth communication module, configured to receive a lock instruction or an unlock instruction based on Bluetooth communication, the system comprising:
    a positioning subsystem, configured to determine, based on the UWB positioning module of the smart lock, an area where the smart lock is located;
    an adjustment subsystem, configured to adjust a sampling mode of the positioning subsystem based on properties of the determined area where the smart lock is located; and
    an alarm subsystem, configured to turn on or turn off the Bluetooth communication module of the smart lock based on the determined area where the smart lock is located, and generate alarm information when it is determined that the smart lock enters a set area.

2. The smart monitoring system according to claim 1, wherein the positioning subsystem comprises:
    a plurality of UWB base stations, arranged in a gate channel for the object equipped with the smart lock to pass through, each of the plurality of UWB base stations communicating with the UWB positioning module; and
    a processing module, configured to obtain distance data based on a distance measurement between the plurality of UWB base stations and the UWB positioning module, and calculate, based on the distance data, the area where the smart lock is located.

3. The smart monitoring system according to claim 2, wherein the positioning subsystem comprises two UWB base stations; and
    wherein the processing module is configured to obtain first distance data and second distance data based on the distance measurement between each of the two UWB base stations and the UWB positioning module, calculate a first distance condition parameter and a second distance condition parameter based on the first distance data and the second distance data and a length and inner diameter of the gate channel, and determine, based on the first distance condition parameter and the second distance condition parameter, the area where the smart lock is located.

4. The smart monitoring system according to claim 3, wherein the adjustment subsystem being configured to adjust a sampling mode of the positioning subsystem based on properties of the area where the smart lock is located comprises:
    the adjustment subsystem being configured to:
    reduce a sampling frequency of the positioning subsystem when it is determined that the object equipped with the smart lock passes through a first type of area; and
    increase a sampling frequency of the positioning subsystem when it is determined that the object equipped with the smart lock passes through a second type of area.

5. The smart monitoring system according to claim 1, wherein the smart lock further comprises:
    a lock body and an unlocking structure; and
    one or more binding tags, each binding tag being associated with a Bluetooth address of the smart lock,
    wherein the unlocking structure is configured to lock or unlock the smart lock based on the lock instruction or the unlock instruction, or lock or unlock the smart lock based on an operation performed on the one or more binding tags.

6. The smart monitoring system according to claim 5, wherein the one or more binding tags comprise at least one of:

an identification code, which is a barcode or a two-dimensional code; and
a Radio Frequency Identification (RFID) tag.

7. The smart monitoring system according to claim 6, wherein locking or unlocking the smart lock based on an operation performed on the one or more binding tags comprises at least one of:
   locking or unlocking the smart lock based on an operation of scanning the identification code; and
   locking or unlocking the smart lock based on an operation of reading the RFID tag.

8. The smart monitoring method according to claim 7, wherein locking or unlocking the smart lock based on an operation performed on the one or more binding tags comprises at least one of:
   locking or unlocking the smart lock based on an operation of reading the RFID tag.

9. A smart monitoring method for monitoring an object equipped with a smart lock, the smart lock comprising: an Ultra Wide Band (UWB) positioning module configured to determine a position of the smart lock based on a UWB positioning method; and a Bluetooth communication module, configured to receive a lock instruction or an unlock instruction based on Bluetooth communication, the method comprising:
   calculating, by a positioning subsystem, base on the UWB positioning module of the smart lock, an area where the smart lock passing through the positioning subsystem is located;
   adjusting, by an adjustment subsystem, a sampling mode of the positioning subsystem based on properties of the calculated area where the smart lock is located;
   turning on or turning off the Bluetooth communication module of the smart lock, by an alarm subsystem, based on the calculated area where the smart lock is located; and
   generating alarm information when it is determined that the smart lock enters a set area.

10. The smart monitoring method according to claim 9, wherein the positioning subsystem comprises a plurality of UWB base stations; and
   wherein calculating the area where the smart lock passing through the positioning subsystem is located comprises:
   obtaining distance data based on a distance measurement between the plurality of UWB base stations and the UWB positioning module of the smart lock; and
   calculating, based on the distance data, the area where the smart lock is located.

11. The smart monitoring method according to claim 10, wherein the positioning subsystem comprises two UWB base stations; and
   wherein calculating the area where the smart lock passing through the positioning subsystem is located comprises:
   obtaining first distance data and second distance data based on the distance measurement between each of the two UWB base stations and the UWB positioning module;
   calculating a first distance condition parameter and a second distance condition parameter based on the first distance data and the second distance data and a length and inner diameter of the gate channel for the object equipped with the smart lock to pass through; and
   determining, based on the first distance condition parameter and the second distance condition parameter, the area where the smart lock is located.

12. The smart monitoring method according to claim 11, wherein adjusting a sampling mode of the positioning subsystem based on properties of the area where the smart lock is located comprises:
   reducing a sampling frequency of the positioning subsystem when it is determined that the object equipped with the smart lock passes through a first type of area; and
   increasing a sampling frequency of the positioning subsystem when it is determined that the object equipped with the smart lock passes through a second type of area.

13. An electronic device, comprising:
   a memory for storing instructions; and
   at least one processor;
   wherein the at least one processor executes the instructions stored in the memory, so as to perform the smart monitoring method according to claim 9.

14. A non-transitory computer-readable storage medium having computer instructions stored thereon, the computer instructions, when executed by the processor, performing the smart monitoring method according to claim 9.

15. The smart monitoring method according to claim 9, wherein the smart lock further comprises:
   a lock body and an unlocking structure; and
   one or more binding tags, each binding tag being associated with a Bluetooth address of the smart lock,
   wherein the unlocking structure is configured to lock or unlock the smart lock based on the lock instruction or the unlock instruction, or lock or unlock the smart lock based on an operation performed on the one or more binding tags.

16. The smart monitoring method according to claim 15, wherein the one or more binding tags comprise at least one of:
   an identification code, which is a barcode or a two-dimensional code; and
   a Radio Frequency Identification (RFID) tag.

* * * * *